(12) United States Patent
Nishigori et al.

(10) Patent No.: US 11,656,683 B2
(45) Date of Patent: May 23, 2023

(54) SIGNAL GENERATION DEVICE, SIGNAL GENERATION METHOD, AND REPRODUCTION DEVICE

(71) Applicant: SONY CORPORATION, Tokyo (JP)

(72) Inventors: Shuichiro Nishigori, Tokyo (JP); Shiro Suzuki, Tokyo (JP); Hirofumi Takeda, Tokyo (JP); Jun Matsumoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,546

(22) PCT Filed: Jun. 25, 2019

(86) PCT No.: PCT/JP2019/025089
§ 371 (c)(1),
(2) Date: Feb. 2, 2021

(87) PCT Pub. No.: WO2020/031527
PCT Pub. Date: Feb. 13, 2020

(65) Prior Publication Data
US 2021/0223867 A1    Jul. 22, 2021

(30) Foreign Application Priority Data
Aug. 10, 2018    (JP) .............................. JP2018-151656

(51) Int. Cl.
*G06F 3/01*    (2006.01)
*H04N 23/68*    (2023.01)

(52) U.S. Cl.
CPC .......... *G06F 3/016* (2013.01); *H04N 23/6812* (2023.01)

(58) Field of Classification Search
CPC ........ G06F 3/016; G06F 3/014; G06F 1/1694; G06F 1/3231
See application file for complete search history.

(56) References Cited

U.S. PATENT DOCUMENTS

| 6,343,188 | B1* | 1/2002 | Morofuji | .................. G03B 5/00 396/55 |
| 2010/0208121 | A1* | 8/2010 | Kato | .................. H04N 5/23248 348/333.07 |

(Continued)

FOREIGN PATENT DOCUMENTS

| CN | 104750245 A | 7/2015 |
| CN | 105721814 A | 6/2016 |

(Continued)

OTHER PUBLICATIONS

International Search Report and Written Opinion of PCT Application No. PCT/JP2019/025089, dated Sep. 3, 2019, 10 pages of ISRWO.

*Primary Examiner* — Nelson M Rosario
*Assistant Examiner* — Scott D Au
(74) *Attorney, Agent, or Firm* — Chip Law Group

(57) ABSTRACT

To achieve simplification in configuration and reduction in cost of a tactile reproduction system that reproduces tactile information. The signal generation device according to the present technology includes a signal generation unit that generates a tactile signal on the basis of a detection value of a motion detection unit that is provided in an imaging device and detects motion of the imaging device. This eliminates the need to provide a separate motion detection unit other than the motion detection unit provided in the imaging device in order to realize a system that reproduces tactile information together with visual information.

10 Claims, 14 Drawing Sheets

(56) References Cited

U.S. PATENT DOCUMENTS

| | | | |
|---|---|---|---|
| 2014/0267904 A1* | 9/2014 | Saboune | G06T 7/20 |
| | | | 348/460 |
| 2015/0189223 A1 | 7/2015 | Levesque et al. | |
| 2016/0180879 A1 | 6/2016 | Ullrich et al. | |
| 2018/0164887 A1 | 6/2018 | Wu et al. | |
| 2018/0359412 A1* | 12/2018 | Oliver | H04N 5/2258 |

FOREIGN PATENT DOCUMENTS

| | | |
|---|---|---|
| CN | 108227915 A | 6/2018 |
| EP | 2889728 A2 | 7/2015 |
| EP | 3035161 A1 | 6/2016 |
| EP | 3336659 A1 | 6/2018 |
| JP | 2014-164172 A | 9/2014 |
| JP | 2015-53038 A | 3/2015 |
| JP | 2016-119071 A | 6/2016 |
| JP | 2016-130169 A | 7/2016 |
| JP | 2018-109961 A | 7/2018 |
| KR | 10-2015-0080435 A | 7/2015 |
| KR | 10-2016-0075341 A | 6/2016 |
| KR | 10-2018-0068873 A | 6/2018 |

* cited by examiner

FIG. 13
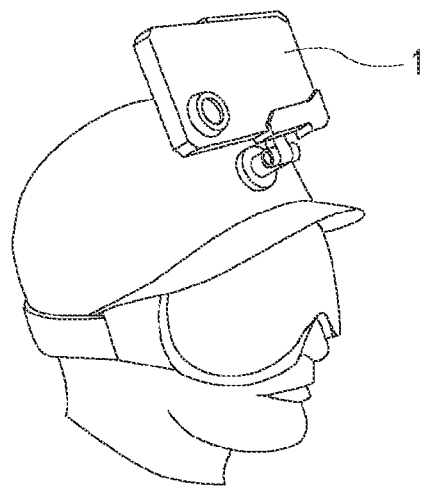
FIG. 14
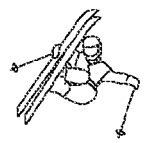
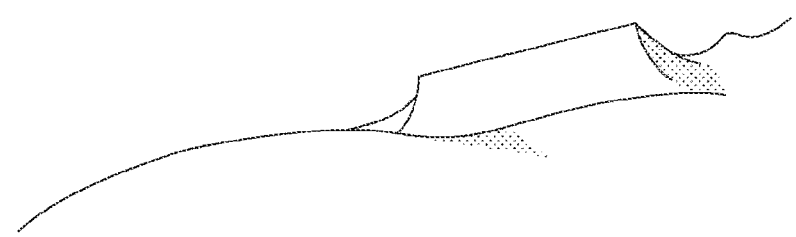
FIG. 15
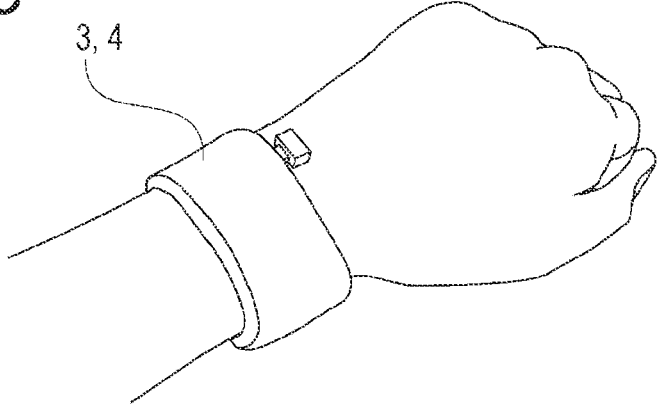

SIGNAL GENERATION DEVICE, SIGNAL GENERATION METHOD, AND REPRODUCTION DEVICE

CROSS REFERENCE TO RELATED APPLICATIONS

This application is a U.S. National Phase of International Patent Application No. PCT/JP2019/025089 filed on Jun. 25, 2019, which claims priority benefit of Japanese Patent Application No. JP 2018-151656 filed in the Japan Patent Office on Aug. 10, 2018. Each of the above-referenced applications is hereby incorporated herein by reference in its entirety.

TECHNICAL FIELD

The present technology relates to a technical field of a signal generation device for generating a tactile signal for causing a person to perceive tactile information, a method thereof, a program, and a reproduction device for reproducing the tactile signal.

BACKGROUND ART

In recent years, applications that give tactile stimuli by a tactile presentation device in contact with human skin have been used in various situations. Here, "tactile presentation" means to generate a tactile stimulus.

For example, in a mobile terminal equipped with a touch panel such as a smartphone, pseudo touch feeling of a button is generated by vibrating the panel (or housing) to give a tactile stimulus to a finger when the panel is touched.

In music listening, a tactile presentation device is built into a headphone housing, and a tactile stimulus is given in parallel with music reproduction to emphasize deep bass.

In the fields of computer games and VR (virtual reality), there are things that enhance the user's immersive feeling by interactively giving tactile stimuli according to the scene by a tactile presentation device installed in the controller according to the user's operation.

In some amusement facilities, the realistic feeling of visitors is improved by giving a tactile stimulus by a tactile presentation device installed in the seat according to the situation in a movie theater or a theme park, for example.

In addition, in the research and development stage, when the robot or the like is remotely controlled, the vibration received by the robot or the object to be operated is fed back to the controller at the operator's hand, so that the situation around the robot or the object is intuitively obtained, which is useful for hazard prediction. (Example: Disaster response robot <http://www.rm.is.tohoku.ac.jp/quince_mech/#_8>)

Furthermore, in the medical field, research is being conducted to improve surgical accuracy by feeding back to the operator the feeling (hardness) of the forceps of the endoscope touching an organ when operating a surgical robot (example: Surgical support robot Da Vinci <http://techon.nikkeibp.co.jp/article/FEATURE/20150217/404460/?P=2>)

Note that, the following Patent Document 1 can be mentioned as a related prior art. Patent Document 1 discloses a technique for generating a tactile signal on the basis of an audio signal, instead of sensing tactile information such as vibration to generate a tactile signal representing a pattern of tactile stimulus.

CITATION LIST

Patent Document

Patent Document 1: Japanese Patent Application Laid-Open No. 2015-53038

SUMMARY OF THE INVENTION

Problems to be Solved by the Invention

Here, as a tactile reproduction system that reproduces tactile information, a system that actually senses tactile information such as vibration received by an object and reproduces the tactile information is currently considered to be a relatively large-scale configuration at high cost, and is not a system that can be easily used by general users.

Therefore, the purpose of the present technology is to overcome the above-mentioned problems and to simplify the configuration and reduce the cost of the tactile reproduction system that reproduces the tactile information.

Solutions to Problems

The signal generation device according to the present technology includes a signal generation unit that generates a tactile signal on the basis of a detection value of a motion detection unit that is provided in an imaging device and detects the motion of the imaging device.

This eliminates the need to provide a separate motion detection unit other than the motion detection unit provided in the imaging device in order to realize a system that reproduces tactile information together with visual information.

In the signal generation device according to the present technology described above, it is desirable that the signal generation unit generate the tactile signal on the basis of the detection value of the motion detection unit which is an angular velocity sensor.

The angular velocity sensor is generally used as a sensor for correcting optical camera shake of an imaging device.

In the signal generation device according to the present technology described above, it is desirable that the signal generation unit generate a displacement signal representing translational movement as the tactile signal on the basis of an angular velocity detected by the angular velocity sensor.

This makes it possible to use a general type of tactile presentation device driven by a displacement signal as a tactile presentation device that gives a tactile stimulus to a tactile receiving person.

In the signal generation device according to the present technology described above, it is desirable that the signal generation unit obtain an angle of the angular velocity sensor by integrating the angular velocity detected by the angular velocity sensor, and convert the angle into displacement to generate the displacement signal.

This makes it possible to appropriately generate a displacement signal from the angular velocity detected by the angular velocity sensor.

In the signal generation device according to the present technology described above, it is desirable that the signal generation unit normalize the displacement value by the maximum value of the displacement, and scale the normalized displacement value within a predetermined bit width range.

This makes it possible to generate a displacement signal that appropriately reflects the magnitude of vibration received by the imaging device.

In the signal generation device according to the present technology described above, it is desirable that the signal generation unit obtain an angle of the angular velocity sensor by integrating the angular velocity detected by the angular velocity sensor, and generate an angular signal representing the transition of the angle on the time axis as the tactile signal.

This eliminates the need to convert the angular velocity detected by the angular velocity sensor into a displacement in a case where the tactile presentation device that gives the tactile stimulus to the tactile receiving person is a device corresponding to an angle.

In the signal generation device according to the present technology described above, it is desirable that the signal generation unit generate a signal synchronized with moving image data obtained by the imaging device as the tactile signal.

It is effective to reproduce visual information together with tactile information in order to provide the tactile receiving person with an experience having a high realistic feeling and a high sense of reality.

In the signal generation device according to the present technology described above, it is desirable that the signal generation unit generate stream data in which frame data of the moving image data obtained by the imaging device and frame data of the tactile signal are stored in the same stream.

The data format for storing the frame data of each data in the same stream as described above is made similar to a general data format adopted for recording and transmitting video/audio data (data including video and audio).

In the signal generation device according to the present technology described above, it is desirable that the motion detection unit detect motion in each of two or more directions of the imaging device, and the signal generation unit generate the tactile signal for each of two or more directions on the basis of the motion in each of the two or more directions detected by the motion detection unit.

This makes it possible for the tactile receiving person to perceive the tactile stimulus including its direction.

In the signal generation device according to the present technology described above, it is desirable that the motion detection unit detect motion in each of two or more directions of the imaging device, and the signal generation unit generate, as the tactile signal, a signal that integrates motions in the above two or more directions detected by the motion detection unit.

It is rare for humans to perceive tactile stimuli particularly due to vibration while clearly recognizing the direction, although there are individual differences. Therefore, even if a tactile signal that integrates motions in two or more directions is generated, it is possible to ensure tactile reproducibility in terms of allowing the tactile receiving person to perceive a tactile stimulus according to the motion of the imaging device.

In the signal generation device according to the present technology described above, it is desirable that the signal generation unit generate the tactile signal on the basis of the detection value of the motion detection unit that detects the motion by image processing on the image captured by the imaging device.

As a result, motion detection of the imaging device is realized by signal processing on the captured image.

Further, the signal generation method according to the present technology is a signal generation method having a signal generation step of generating a tactile signal on the basis of a detection value of a motion detection unit that is provided in the imaging device and detects the motion of the imaging device.

Also with such a signal generation method, the similar operation as that of the signal generation device according to the present technology can be obtained.

Further, the program according to the present technology is a program that causes an information processing device to realize a signal generation function for generating a tactile signal on the basis of the detection value of the motion detection unit that is provided in the imaging device and detects the motion of the imaging device.

By such a program, the signal generation device according to the present technology described above is realized.

Further, a reproduction device according to the present technology includes a reproduction unit that reproduces a tactile signal generated on the basis of a detection value of the motion detection unit that is provided in the imaging device and detects the motion of the imaging device.

Also with such a reproduction device, the similar operation as that of the signal generation device according to the present technology described above can be obtained.

Effects of the Invention

According to the present technology, it is possible to simplify the configuration and reduce the cost of a tactile reproduction system that reproduces the tactile information.

Note that the effects described here are not necessarily limited and may be any effects described in the present disclosure.

BRIEF DESCRIPTION OF DRAWINGS

FIG. 13 is a diagram showing an example of a fixing method of an imaging device for the first modification related to the application of tactile reproduction.

FIG. 14 is a diagram for explaining an example of tactile information for the first modification related to the application of tactile reproduction.

FIG. 15 is a diagram showing a mounting example of a tactile presentation device for the first modification related to the application of tactile reproduction.

MODE FOR CARRYING OUT THE INVENTION

Hereinafter, embodiments according to the present technology will be described in the following order with reference to the accompanying drawings.
<1. Overview of tactile reproduction system>
<2. Configuration of imaging device>
<3. Configuration of reproduction device>
<4. Tactile reproduction method as an embodiment>
[4-1. Tactile signal generation method]
[4-2. Data format example]
<5. Modification>
[5-1. First modification]
[5-2. Second modification]
[5-3. Third modification]
[5-4. Other modifications]
<6. Summary of embodiment>
<7. The present technology>

Here, in this specification, each term is defined as follows.

Tactile information=information perceived by tactile sensation

Tactile stimulus: A physical phenomenon for causing a person to perceive tactile information, such as a vibration phenomenon.

Tactile presentation: To generate a tactile stimulus.

Tactile signal: A signal that represents a pattern of tactile stimuli, such as a signal that represents a vibration waveform.

Tactile receiving person: The person who receives the tactile presentation.

<1. Overview of Tactile Reproduction System>

Figure 1:
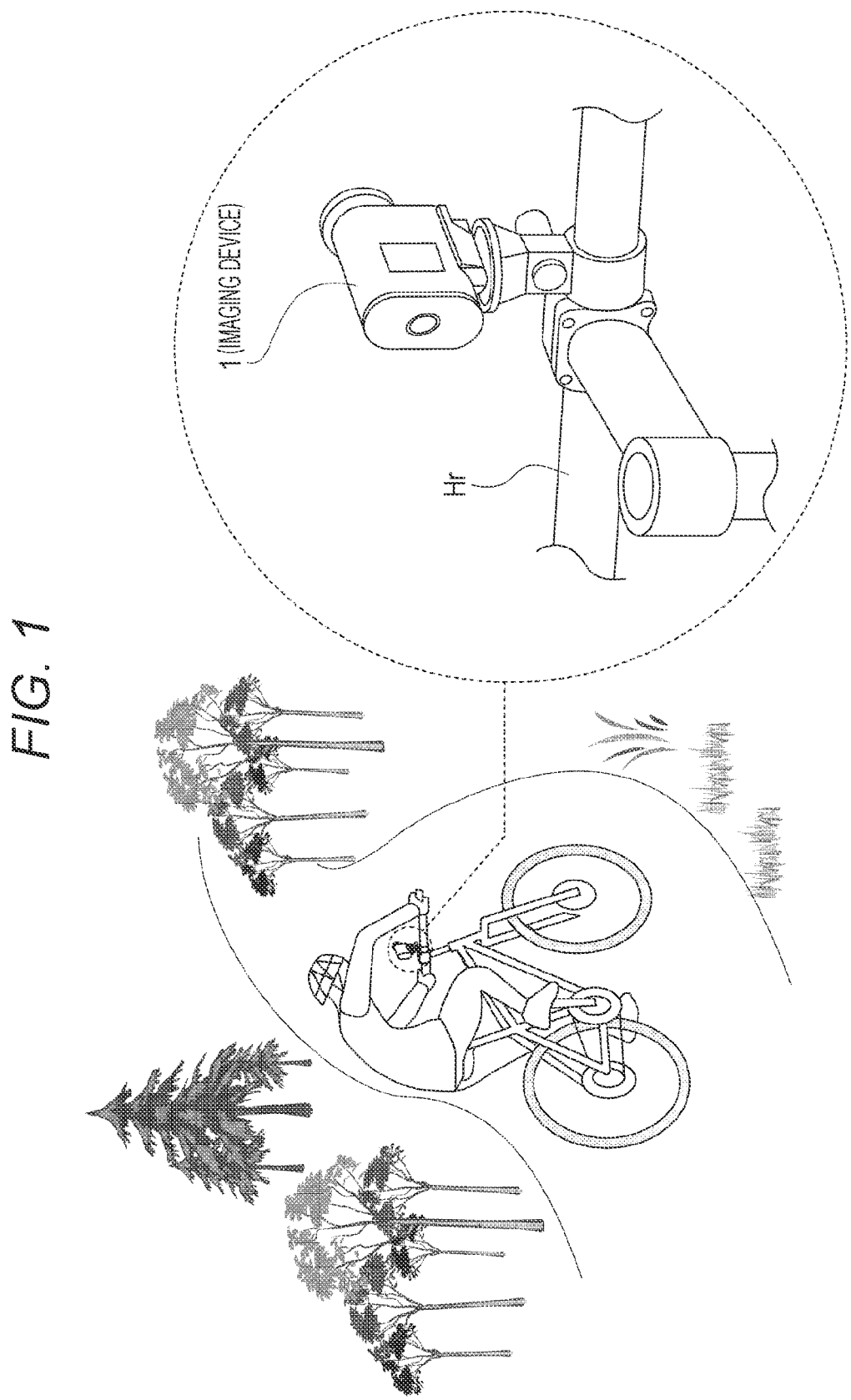
FIG. 1 is a diagram for explaining an outline of a tactile reproduction system as an embodiment, and is a diagram showing a state of a tactile information detection environment.
Figure 2:
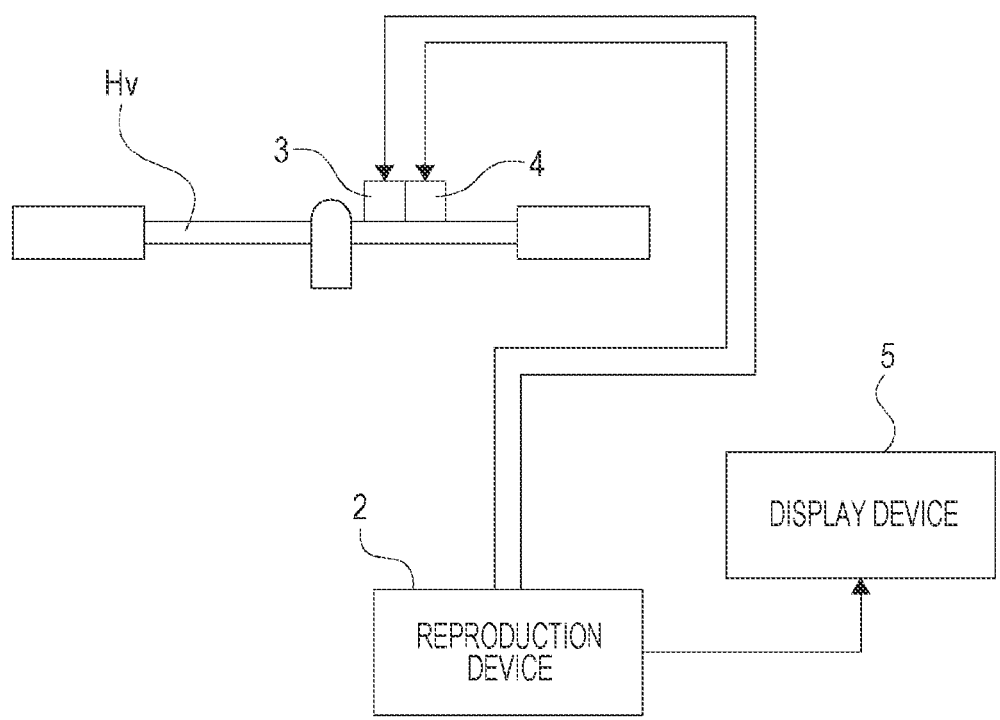
FIG. 2 is a diagram for explaining an outline of a tactile reproduction system as an embodiment, and is a diagram showing a state of a tactile information reproduction environment.

FIGS. 1 and 2 are diagrams for explaining an outline of a tactile reproduction system as an embodiment.

FIG. 1 shows a state in a detection environment, which is an environment for detecting tactile information to be reproduced.

In the tactile reproduction system of the present embodiment, it is assumed that the tactile information to be reproduced is a vibration generated in a handlebar Hr when the bicycle is run. In the tactile reproduction system of the present embodiment, the vibration generated in the handlebar Hr of the bicycle is detected in a detection environment to generate a tactile signal for reproducing the tactile information, and an imaging device 1 attached to the handlebar Hr captures a moving image.

In the tactile reproduction system of this example, the tactile information and the visual information in the detection environment are reproduced for the tactile receiving person in the reproduction environment shown in FIG. 2 on the basis of these tactile signals and the moving images obtained in the detection environment.

The reproduction environment shown in FIG. 2 includes a reproduction device 2 that reproduces tactile signals and moving images obtained in the detection environment, a bicycle handlebar Hv, a tactile presentation device 3 and a tactile presentation device 4 attached to the handlebar Hv, and a display device 5 for displaying an image. Note that, the handlebar Hv may be a model instead of the bicycle handlebar itself.

The display device 5 is connected to the reproduction device 2 and displays an image to the tactile receiving person. In this example, as the display device 5, for example, a display device such as an HMD (head-mounted display), which is attached to the tactile receiving person and displays an image so as to cover the field of view of the tactile receiving person, is used. The display device 5 displays the moving image reproduced by the reproduction device 2.

The display device 5 of this example is provided with a speaker for two channels on the left and right, and is capable of presenting sound to the tactile receiving person.

In this example, devices such as a vibrator and an actuator are used as the tactile presentation devices 3 and 4. The tactile presentation devices 3 and 4 are driven on the basis of a drive signal generated by the reproduction device 2 on the basis of the tactile signal.

<2. Configuration of imaging device>

Figure 3:
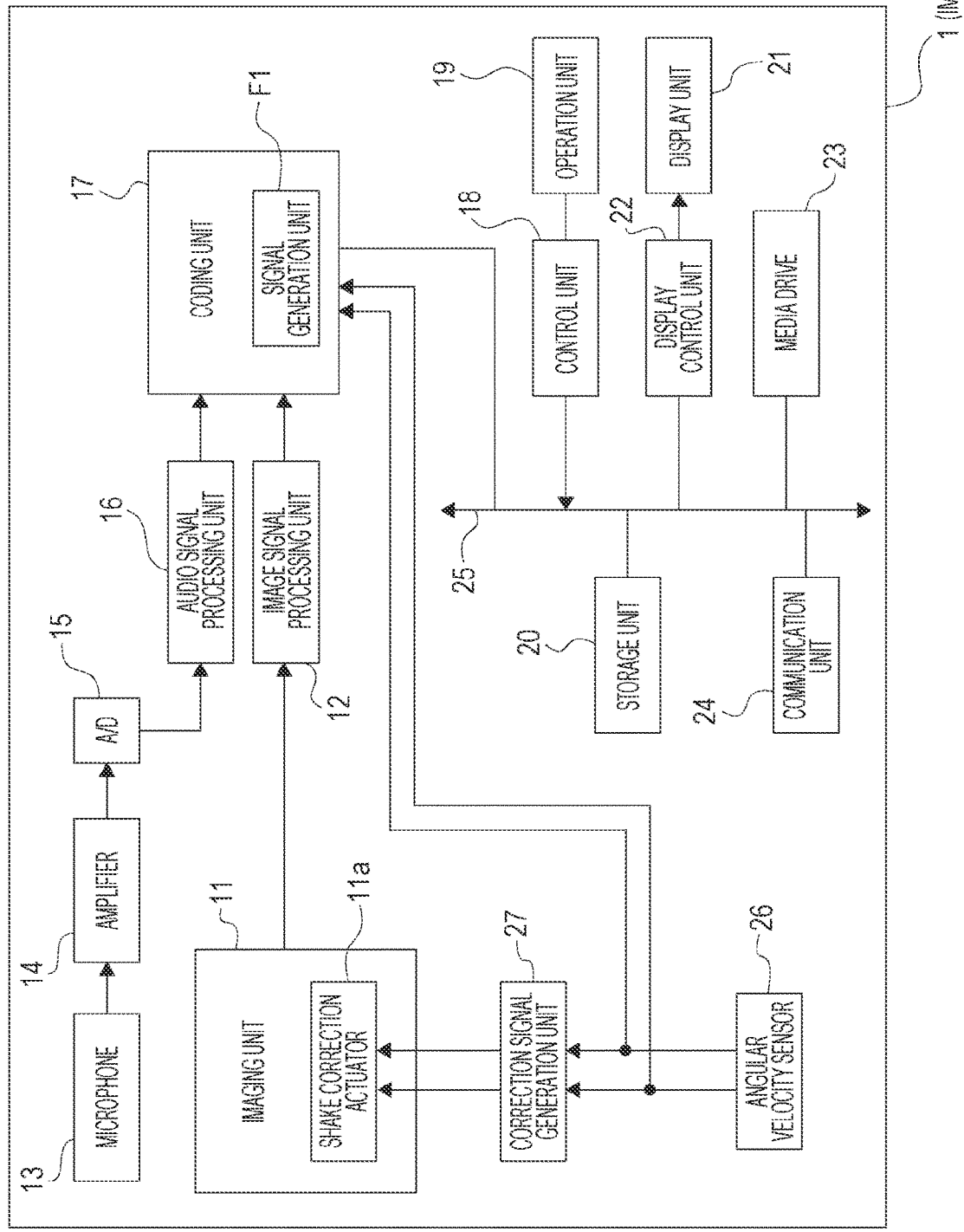
FIG. 3 is a diagram showing an example of an internal configuration of an imaging device (signal generation device) according to an embodiment.

FIG. 3 shows an example of the internal configuration of the imaging device 1 shown in FIG. 1.

The imaging device 1 includes an imaging unit 11, an image signal processing unit 12, a microphone 13, an amplifier 14, an A/D converter 15, an audio signal processing unit 16, a coding unit 17, a control unit 18, an operation unit 19, a storage unit 20, a display unit 21, a display control unit 22, a media drive 23, a communication unit 24, a bus 25, an angular velocity sensor 26, and a correction signal generation unit 27.

The imaging unit 11 includes an imaging optical system including various lenses and optical elements, an imaging element using a CCD (Charge Coupled Device) sensor, a CMOS (Complementary Metal Oxide Semiconductor) sensor or the like, a sampling circuit (reading circuit) for sampling the accumulated charge of the imaging element, and an A/D converter, and obtains a captured image signal (captured image data) based on a digital signal.

The image signal processing unit 12 performs various image signal processing on the captured image signal based on the digital signal obtained by the imaging unit 11 and outputs the image signal to the coding unit 17. Here, the captured image signal in this example is a moving image signal.

A sound collection signal by the microphone 13 is converted into a digital signal by the A/D converter 15 via the amplifier 14, then subjected to predetermined audio signal processing by the audio signal processing unit 16 and input to the coding unit 17.

Here, in FIG. 3, in order to avoid complication of the illustration, the microphone 13, the amplifier 14, and the A/D converter 15 are shown for only one channel, but the imaging device 1 of this example actually has the microphones 13, the amplifiers 14, and the A/D converters 15 for two channels on the left and right, and a sound collection signal (audio signal) for two channels is input to the coding unit 17 via the audio signal processing unit 16.

The coding unit 17 includes a DSP (Digital Signal Processor), and performs coding according to a predetermined data format on a captured image signal input via the image signal processing unit 12 and an audio signal input via the audio signal processing unit 16.

The coding unit 17 in this example has a signal generation unit F1, and the signal generation unit F1 also performs generation and coding of a tactile signal, which will be described again.

Although the details will be described later, the coding unit 17 of this example generates stream data including the captured image signal, the audio signal, and the tactile signal in the same stream. In this example, the tactile signal is a signal for two channels, and the stream data includes the tactile signal for two channels.

The coding unit 17, the control unit 18, the storage unit 20, the display control unit 22, the media drive 23, and the communication unit 24 are communicably connected to each other via the bus 25.

The control unit 18 includes a microcomputer (information processing device) having a CPU (Central Processing Unit), a ROM (Read Only Memory), a RAM (Random Access Memory), etc., and the CPU integrally controls the entire imaging device 1 by executing processing according to a program stored in the ROM or the like.

The RAM is used for temporary storage of data, programs, etc. as a work area for various data processing of the CPU. The ROM is used to store an OS (Operating System) for the CPU to control each part, content files such as image files, application programs for various operations, firmware, and the like.

The operation unit 19 is connected to the control unit 18. The operation unit 19 is realized as, for example, various operation elements provided on the housing of the imaging device 1 or a touch panel formed on the display unit 21, and outputs operation input information according to the operation input to the control unit 18.

The control unit 18 executes processing according to the operation input information so that an operation according to the operation input is realized in the imaging device 1.

The storage unit 20 includes, for example, a non-volatile memory, and is used to store various data. In particular, the storage unit 20 is used to store data used by the control unit 18 for various controls.

The display unit 21 is formed as a display device such as an LCD (Liquid Crystal Display) or an organic EL (Electro-Luminescence) display formed on the housing of the imaging device 1, and displays various information to the user.

The display control unit 22 generates display data as, for example, a through image to be output to the display unit 21 under the control of the control unit 18. The display data as the through image is basically the data of each frame as the resolution-converted captured image data.

Further, the display control unit 22 causes various guide images, character images, operation images, and the like to be displayed on the display unit 21 in a format of being superimposed on an image such as a through image, on the basis of the instructions of the control unit 18.

The media drive 23 is configured to/from which a portable recording medium is attachable/detachable, and is configured as a reader/writer unit for writing and reading data to the mounted recording medium. Examples of the recording medium supported by the media drive 23 include a memory card (for example, a portable flash memory) that is attachable/detachable to/from the imaging device 1.

The media drive 23 can write (record) the above-mentioned stream data (stream data including the captured image signal, audio signal, and tactile signal) generated by the coding unit 17 to the portable recording medium.

The communication unit 24 performs data communication and network communication with an external device by wire or wirelessly. The above stream data can be transmitted to an external device via the communication unit 24.

Here, the imaging device 1 of the present embodiment has an optical camera shake correction function.

As a configuration for realizing the optical camera shake correction function, the imaging device 1 is provided with a shake correction actuator 11a in the imaging unit 11, and provided with the angular velocity sensor 26 and the correction signal generation unit 27.

The angular velocity sensor 26 detects an angular velocity with respect to a target axis. The angular velocity sensor 26 of this example is a so-called two-axis angular velocity sensor, and is arranged in the imaging device 1, when the directions orthogonal to each other in a plane parallel to an imaging surface of the imaging element are the X-axis direction and the Y-axis direction, so as to detect the angular velocity in the direction around the X-axis and the angular velocity in the direction around the Y axis. Here, it is assumed that the X-axis direction is a direction parallel to the horizontal line direction of the imaging element, and the Y-axis direction is a direction parallel to the vertical line direction of the imaging element.

The shake correction actuator 11 is an actuator that drives a shake correction lens arranged in an optical system included in the imaging unit 11.

The correction signal generation unit 27 calculates the deviation between the imaging element and the optical axis on the basis of the angular velocity detected by the angular velocity sensor 26, calculates an amount of movement of the shake correction lens required in the direction of canceling the deviation, and generates a drive signal of the above-mentioned shake correction actuator 11a according to the above amount of movement.

By driving the shake correction actuator 11a on the basis of the drive signal, the shake correction lens is displaced so as to cancel the deviation between the imaging element and the optical axis, and the shake correction is realized.

Note that, as for the optical camera shake correction, a method of displacing the imaging element can be also adopted instead of a method of displacing the shake correction lens.

Here, in this example, the detection values of the angular velocities of the X-axis and the Y-axis by the angle sensor 26 are input to the coding unit 17, which will be described again.

<3. Configuration of Reproduction Device>

Figure 4:
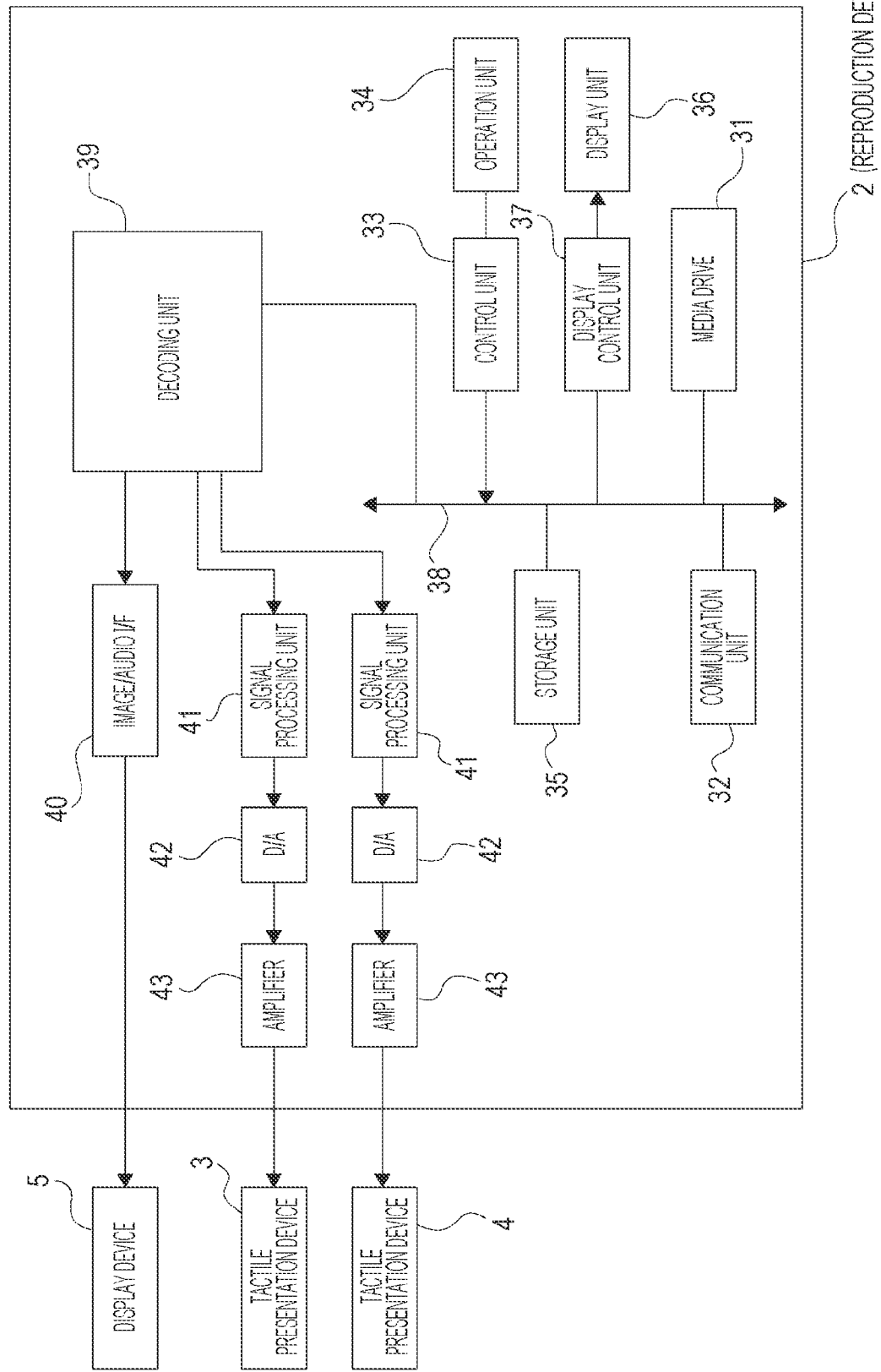
FIG. 4 is a diagram for explaining an example of an internal configuration of a reproduction device according to an embodiment.

FIG. 4 is a diagram for explaining an example of the internal configuration of the reproduction device 2 shown in FIG. 1, and shows the tactile presentation devices 3 and 4 and the display device 5 together with the example of the internal configuration of the reproduction device 2.

The reproduction device 2 includes a media drive 31, a communication unit 32, a control unit 33, an operation unit 34, a storage unit 35, a display unit 36, a display control unit 37, a bus 38, a decoding unit 39, an image/audio I/F (interface) 40, a signal processing unit 41, a D/A converter 42, and an amplifier 43.

As shown in the figure, the media drive 31, the communication unit 32, the control unit 33, the storage unit 35, the display control unit 37, and the decoding unit 39 are connected via the bus 38 so that data communication can be performed with each other.

Further, in the reproduction device 2 of this example, the signal processing unit 41, the D/A converter 42, and the amplifier 43 are each provided for two channels in response to the fact that the tactile signal is for two channels.

The media drive 31 is configured to/from which a portable recording medium is attachable/detachable, and is configured as a reader/writer unit for writing and reading data to the mounted recording medium. The media drive 31 is configured to be able to write and read data on a recording medium on which the media drive 23 in the imaging device 1 can record.

By providing the media drive 31, it is possible for the reproduction device 2 to acquire the above-mentioned stream data from the imaging device 1 via the recording medium.

The communication unit 32 performs data communication and network communication with an external device by wire or wirelessly.

By providing the communication unit 32, it is possible for the reproduction device 2 to acquire the above-mentioned stream data from the imaging device 1.

The control unit 33 includes a microcomputer (information processing device) having a CPU, ROM, RAM, etc., and the CPU integrally controls the entire reproduction device 2 by executing processing according to a program stored in the ROM or the like.

The RAM is used for temporary storage of data, programs, etc. as a work area for various data processing of the CPU. The ROM is used to store the OS for controlling each part by the CPU, application programs for various operations, firmware, and the like.

The operation unit 34 is connected to the control unit 33. The operation unit 34 is realized as, for example, various operation elements provided on the housing of the reproduction device 2, and outputs operation input information according to the operation input to the control unit 33.

The control unit 33 executes processing according to the operation input information so that an operation according to the operation input is realized in the reproduction device 2.

The storage unit 35 includes, for example, a non-volatile memory, and is used for storing various data. In particular, the storage unit 35 is used to store data used by the control unit 33 for various controls.

The display unit 36 is formed as a display device such as an LCD or an organic EL display formed on the housing of the reproduction device 2, for example, and displays various information to the user.

The display control unit 37 generates display data to be output to the display unit 36 according to the control of the control unit 33, and causes the display unit 36 to display the display data.

The decoding unit 39 inputs the stream data read from the recording medium mounted on the media drive 31 or the stream data received from the imaging device 1 via the communication unit 32 via the bus 38, and decodes (reproduces) the captured image signal, audio signal, and tactile signal included in the stream data. Note that, the decoding unit 39 decodes the stream data in response to an instruction given by the control unit 33 on the basis of, for example, an operation input via the operation unit 34.

The decoded captured image signal and audio signal are output to the display device 5 in a predetermined transmission data format via the image/audio I/F 40.

As a result, the display device 5 can display a moving image based on the captured image signal and output a sound based on the audio signal.

Further, the decoded tactile signals are input to the signal processing unit 41 of the corresponding channels, respectively. Each signal processing unit 41 performs signal processing such as calibration of the tactile presentation device 3 or the tactile presentation device 4 and predetermined filter processing on the tactile signals of the corresponding channels as necessary.

Each tactile signal that has passed through the signal processing unit 41 is digital/analog-converted by the D/A converter 42 of the corresponding channel, then adjusted to an appropriate dynamic range by the amplifier 43 of the corresponding channel, and output to corresponding one of the tactile presentation devices 3 and 4.

<4. Tactile Reproduction Method as an Embodiment>

Here, in the embodiment, in reproducing the tactile information, a method of actually sensing the tactile information in the detection environment is adopted. Conventionally, vibration sensors such as a piezo pickup and an acceleration sensor are used for sensing tactile information, especially for vibration sensing, but in the detection environment as shown in FIG. 1, providing these vibration sensors in addition to the imaging device 1 is not desirable because it complicates the system configuration and increases the cost.

In the present embodiment, the imaging device 1 includes the angular velocity sensor 26 for optical camera shake correction, and it can be understood that the angular velocity sensor 26 detects shake, that is, vibration generated in the imaging device 1.

Therefore, in the present embodiment, a tactile signal is generated on the basis of the detection value of the angular velocity sensor 26 for such optical camera shake correction.

In this example, devices such as a vibrator and an actuator are used as the tactile presentation devices 3 and 4 shown in FIGS. 2 (and 4), and these are devices that express vibration due to linear reciprocating motion. In other words, it is a device that expresses translational movement.

On the other hand, it goes without saying that the angular velocity sensor 26 detects the angular velocity, and therefore, if the detection value of the angular velocity sensor 26 is used as it is, the tactile presentation devices 3 and 4 cannot be driven appropriately.

Therefore, in this example, the displacement of the angular velocity sensor 26 (that is, the displacement of the imaging device 1) is obtained from the detection value by the angular velocity sensor 26, and a displacement signal representing the displacement in the translational movement is generated as a tactile signal.

Hereinafter, a specific method for generating a tactile signal as such a displacement signal will be described with reference to FIGS. 5 and 6.

Figure 5:
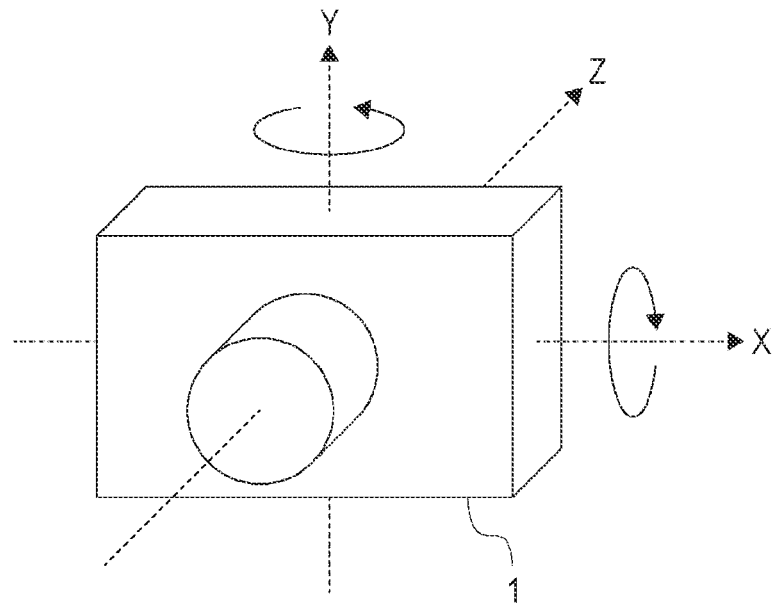
FIG. 5 is an explanatory diagram of a relationship between an imaging device and each axis.

FIG. 5 is an explanatory diagram of the relationship between the imaging device 1 and each axis. Specifically, FIG. 5 illustrates the relationship between the imaging device 1 and the X axis, Y axis, and Z axis when the imaging devices 1 is in an upright state, that is, in a state where the horizontal line direction of the imaging element is parallel to the horizontal direction and the vertical line direction is parallel to the vertical direction. Here, the Z axis is an axis orthogonal to the X-Y plane.

As shown in the figure, the angular velocity sensor 26 detects the angular velocities in the direction around the X-axis and in the direction around the Y-axis, respectively.

Here, first, an example of generating a displacement signal representing the displacement of the angular velocity sensor 26 (displacement of the imaging device 1) in the Y-axis direction on the basis of the angular velocity around the X-axis will be described.

In the following description, it is assumed that the angular velocity sensor 26 outputs the angular velocity around the X-axis at intervals of a period T [sec].

Figure 6:
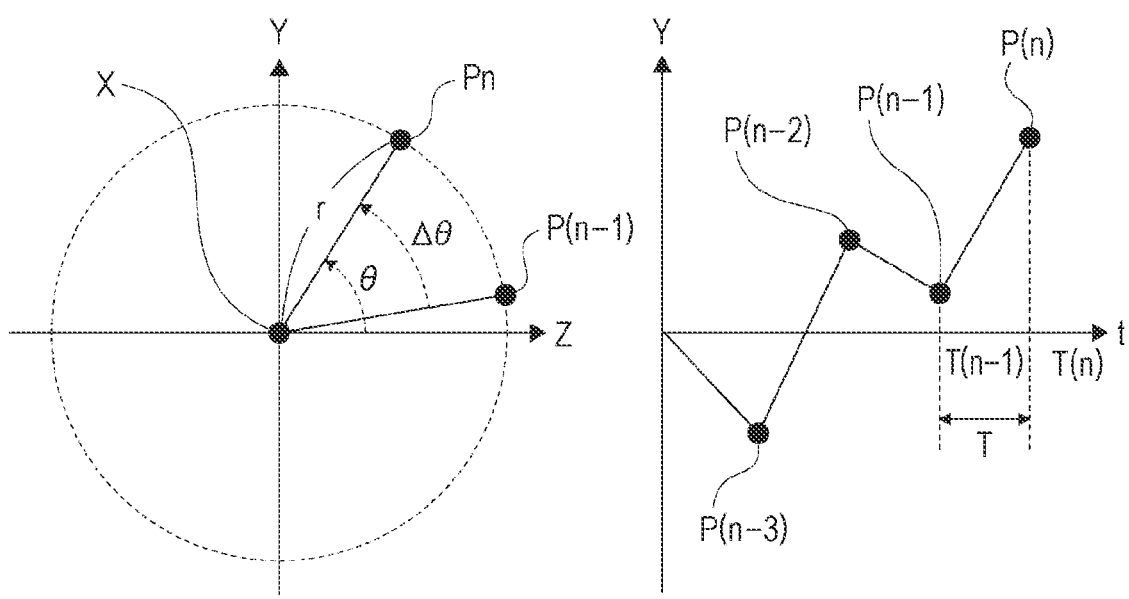
FIG. 6 is an explanatory diagram of a method of obtaining a displacement from an angular velocity.

FIG. 6 is an explanatory diagram of a method of obtaining the displacement from the angular velocity.

In FIG. 6, the figure on the left side illustrates the transition of the position of the angular velocity sensor 26 in a state where the X-axis direction coincides with the paper depth direction. Specifically, with a certain time Tn as a reference, the transition from a position P(n−1) of the angular velocity sensor 26 at T(n−1) one unit time before the time Tn to a position Pn of the angular velocity sensor 26 at time Tn is illustrated.

As illustrated in this figure, it is regarded that the angular velocity sensor 26 is making a rotational movement on the Y-Z plane around the intersection of the X-axis, the Y-axis, and the Z-axis.

The distance from the center of this rotational movement to the angular velocity sensor 26 is constant because the position of the angular velocity sensor 26 is considered to be fixed in the imaging device 1, and therefore a radius r [m] of the rotational movement is assumed to be a known fixed value.

When considering the conversion from the rotational movement on the Y-Z plane to the translational movement, it is possible to convert to either the Y-axis or the Z-axis, but here projection on the Y-axis is performed.

The figure on the right side in FIG. 6 shows how the rotational movement on the Y-Z plane shown in the left figure is converted into a time-series translational movement on the Y axis. Note that, in the figure on the right side, the position P(n−2) at the time T(n−2) and the position P(n−3) at the time T(n−3) are also illustrated.

The angle Δθ [rad] at which the angular velocity sensor 26 moves during the time T [sec] is obtained by Δθ=ωTn·T using the angular velocity (din output at the time Tn. Further, the angle θ(t) of the angular velocity sensor 26 at the current time t can be obtained by integrating the angular velocity as shown in the following [Equation 1].

[Math. 1]

$$\theta(t) = \int_0^t \omega(t)dt \quad \text{[Equation 1]}$$

Considering this as a digital signal, the time t is expressed as a multiple of the period T [sec], which is t=0, T, 2T, . . . , nT, and can be expressed by the following [Equation 2].

[Math. 2]

$$\theta[t] = \sum_{t=0}^{t} \omega[t] \quad \text{[Equation 2]}$$

The coordinates on the Y-axis when the angle θ [rad] can be expressed by the following [Equation 3].

[Math. 3]

$$y = r \cdot \sin\theta \quad \text{[Equation 3]}$$

The figure on the right side of FIG. 6 is a time-series plot of the coordinates on the Y-axis for each period T [sec], and, as it were, it can be said that this represents the displacement of the vertical vibration of the imaging device 1 in time series. That is, the information of the angular velocity of the imaging device 1 is converted into a signal (vibration signal in the Y-axis direction) representing the translational movement of the imaging device 1 in the vertical direction.

Although not shown, similarly, the vibration signal in the X-axis direction (left-right direction of the imaging device 1) can be obtained by using the angular velocity of the rotational movement about the Y-axis.

In this example, corresponding to obtaining these vibration signals in the Y-axis direction and vibration signals in the X-axis direction as tactile signals for two channels, the tactile presentation devices 3 and 4 are fixed to the handlebar Hv so that vibration directions match the Y-axis direction (vertical direction) and the X-axis direction (left-right direction), respectively. Then, the tactile presentation device 3 is supplied with a drive signal based on the tactile signal representing the vibration in the Y-axis direction, and the tactile presentation device 4 is supplied with a drive signal based on the tactile signal representing the vibration in the X-axis direction. The vibration generated in the imaging device 1 due to this is presented to the tactile receiving person in a manner that also expresses the vertical and horizontal directions.

Here, after the conversion from the rotational movement to the translational movement, displacement scaling should be considered.

Specifically, in this example, the obtained displacement is normalized once with r [m], which is the maximum value of the displacement, and the normalized value is scaled (for example, if it is a 16-bit signal, scale it to −32768 to 32767) using the maximum value of the desired bit width.

A specific processing procedure for realizing the tactile signal generation as an embodiment including such scaling will be described with reference to the flowchart of FIG. 7.

Figure 7:
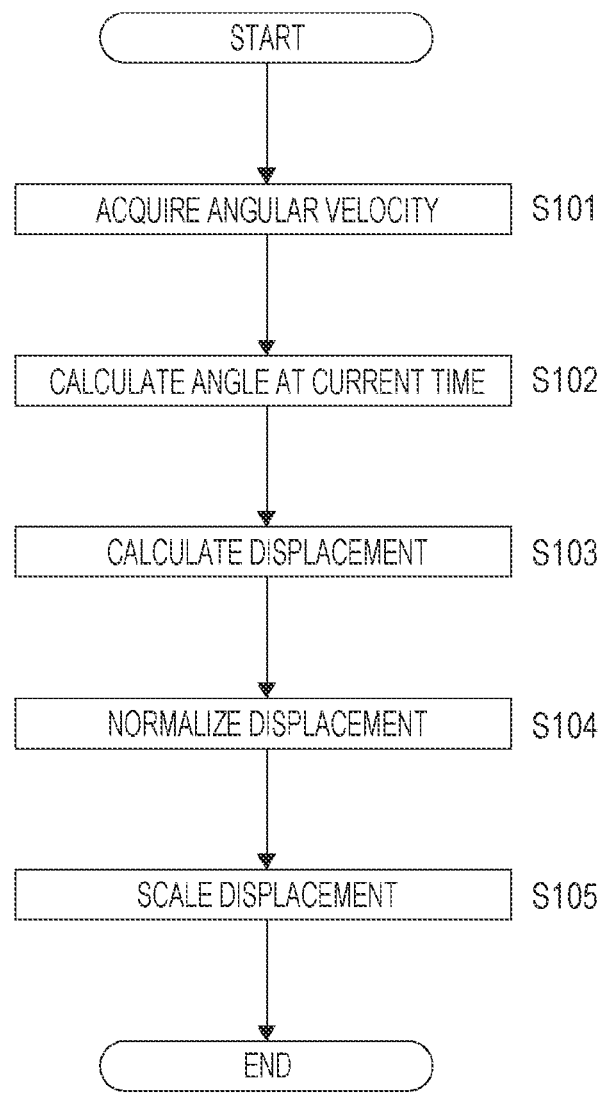
FIG. 7 is a flowchart showing a specific processing procedure for realizing tactile signal generation as an embodiment.

Here, the processing shown in FIG. 7 is a processing executed by the coding unit 17 shown in FIG. 3 as the signal generation unit F1. Note that, although FIG. 7 shows only the processing for one channel, in this example, the processing for two channels in the Y-axis direction and the X-axis direction is performed.

In FIG. 7, the coding unit 17 acquires the angular velocity in step S101. That is, the detection value of the corresponding channel (angular velocity in either the direction around X-axis or the direction around Y-axis) is acquired from the angular velocity sensor 26.

In the following step S102, the coding unit 17 calculates the angle at the current time. That is, the angle θ [t] is calculated by the above [Equation 2].

Next, the coding unit 17 calculates the displacement in step S103. Specifically, similarly to the above [Equation 3], the value of the displacement in the target axial direction is calculated by "r·sin θ" using the angle θ [t].

Further, in the subsequent step S104, the coding unit 17 performs processing of dividing the displacement value obtained in step S103 by r (maximum displacement value) as processing of normalizing the displacement. By this normalization processing, the displacement value falls within the range of −1.0 to 1.0.

Then, in step S105, as processing of scaling the displacement, the coding unit 17 multiplies the normalized displacement value by a value corresponding to the maximum value of the desired bit width in order to scale the normalized displacement value to the range of the desired bit width. For example, if the bit width=16 bits, multiply by the value corresponding to 65536 (for example, if the displacement is a negative value, multiply by 32768, and if the displacement is a positive value, multiply by 32767).

Corresponding to execution of the scaling processing in step S105, the coding unit 17 ends the processing shown in FIG. 7.

[4-2. Data Format Example]

Subsequently, an example of a data format for recording and transmitting a tactile signal obtained by the imaging device 1 as described above will be described.

As described above, the coding unit 17 of this example generates stream data including the tactile signal together with the captured image signal and the audio signal in the same stream.

Figure 8:
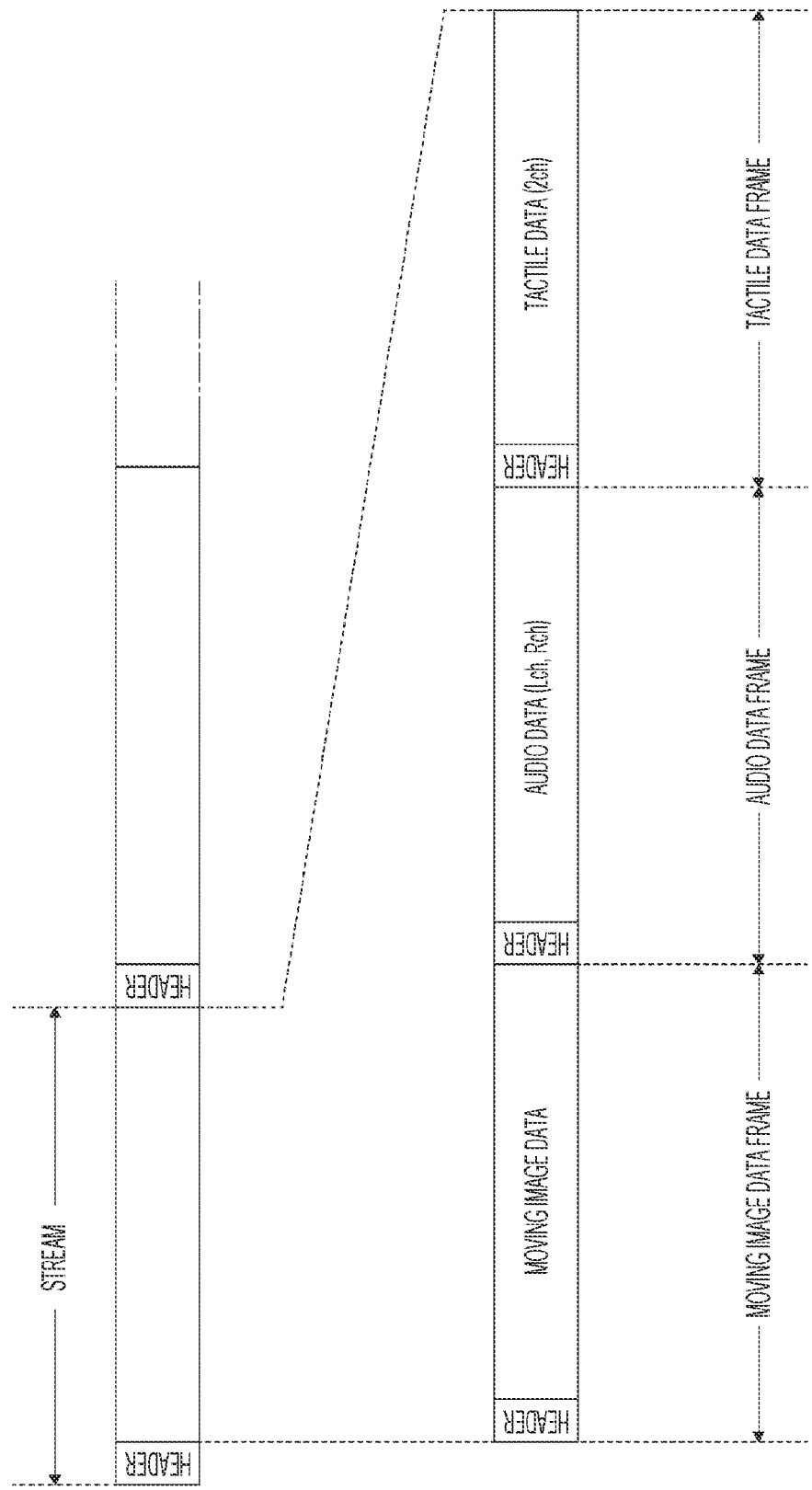
FIG. 8 is a diagram showing an example of a data structure of stream data for recording and transmitting a tactile signal.

FIG. 8 shows an example of a data structure of stream data.

In the stream data, a plurality of streams is arranged in chronological order. Each stream is provided with an area for storing a stream header at the beginning, and the area following the stream header includes an area for storing a moving image data frame which is a frame of the captured image signal (moving image data), an audio data frame which is a frame of the audio data (in this example, for two channels of L and R) based on a sound collection signal, and a tactile data frame which is a frame of the tactile data (in this example, digitized tactile signals after being converted to displacement: for two channels). Note that, in the stream header, for example, a synchronization word for identifying the beginning of the stream, information of the number of frames included in the stream, and the like are stored as header information.

Each frame of moving image data, audio data, and tactile data is provided with an area for storing a frame header at the beginning, and an area following the frame header is for storing actual data of moving image data, audio data, and tactile data, respectively.

In the frame header, a synchronization word for identifying the beginning of the frame, information of the number of bytes of data for one frame, and the like are stored. In particular, in this example, the frame header also stores time stamp information for realizing synchronization between moving image data, audio data, and tactile data.

In the moving image data frame and the audio data frame, for each of the moving image data and the audio data, compression coded data compressed by a predetermined compression coding system is stored. For example, it is conceivable that the moving image data is compressed and encoded by the H.264 method or the like, and the audio data is compression coded by the AAC (Advanced Audio Coding) system or the like.

Here, since the tactile signal is a one-dimensional signal, it can be treated in the similar manner as the audio signal.

Figure 9:
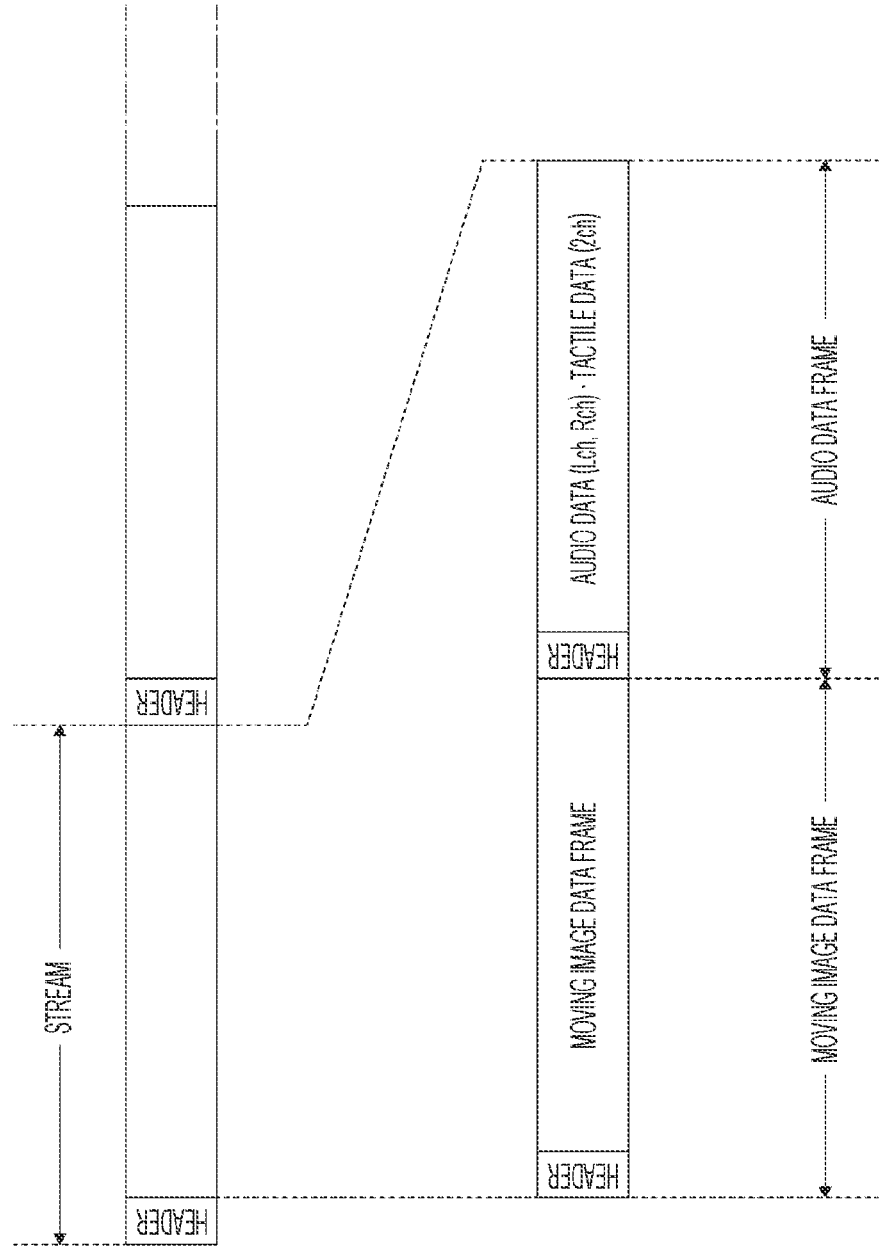
FIG. 9 is a diagram showing another example of a data structure of stream data for recording and transmitting a tactile signal.

In consideration of this point, the stream data may have a structure in which the tactile data is stored in the audio data frame together with the audio data as illustrated in FIG. 9.

However, in a case where the tactile data is stored in the audio data frame in this way, it may be necessary to match the sampling frequency of the tactile data with the sampling frequency of the audio data. In a case where a vibration signal is treated as a tactile signal as in this example, humans can only perceive vibrations up to about 1 kHz as a tactile stimulus, so about 2 kHz is sufficient for the sampling frequency of the tactile data. In a case where the sampling frequency of the tactile data is smaller than the sampling frequency of the audio data (44.1 kHz, 48 kHz, etc.) in this way, the coding unit 17, when generating the stream data shown in FIG. 9, performs oversampling for matching the sampling frequency of the tactile data with the audio data side.

In this case, the coding unit 17 stores the tactile data on which the sampling frequency matching has been performed with the audio data side as the audio data of the third and fourth channels in the audio data frame. As a result, tactile data can be recorded/transmitted using recording/transmitting data formats of the video/audio data (data including video and audio) that are widely used at present, and it is possible to save the trouble of formulating a new data format and developing a new decoding algorithm for stream data and to reduce the cost of realizing a tactile reproduction system.

In a case where the method of separately storing the tactile data frame as shown in FIG. 8 is adopted, there is an advantage that it is not necessary to perform the sampling frequency matching as described above. That is, the sampling frequency of tactile data can be suppressed to about 2 kHz, and there is an advantage that the data capacity of recording/transmitting data can be reduced.

Here, the decoding unit 39 in the reproduction device 2 decodes the coded data as the stream data as described above to obtain each data of moving image data, audio data, and tactile data. That is, the moving image data, the audio data, and the tactile data are reproduced on the basis of the stream data.

The reproduction (decoding) here means a process including at least acquiring moving image data, audio data, and tactile data on the basis of the information of the stream header and the frame header.

<5. Modification>

[5-1. First Modification]

Hereinafter, a modification of the embodiment will be described.

In the above, an example of recording and transmitting a signal converted up to a displacement has been given corresponding to a case where the tactile presentation devices 3 and 4 are of a type of device driven in response to a displacement signal representing translational movement.

However, it is not essential to convert up to the displacement on the imaging device 1 side, and it is also possible to record and transmit an angular signal representing the transition of the angle θ [t] described above.

Figure 10:
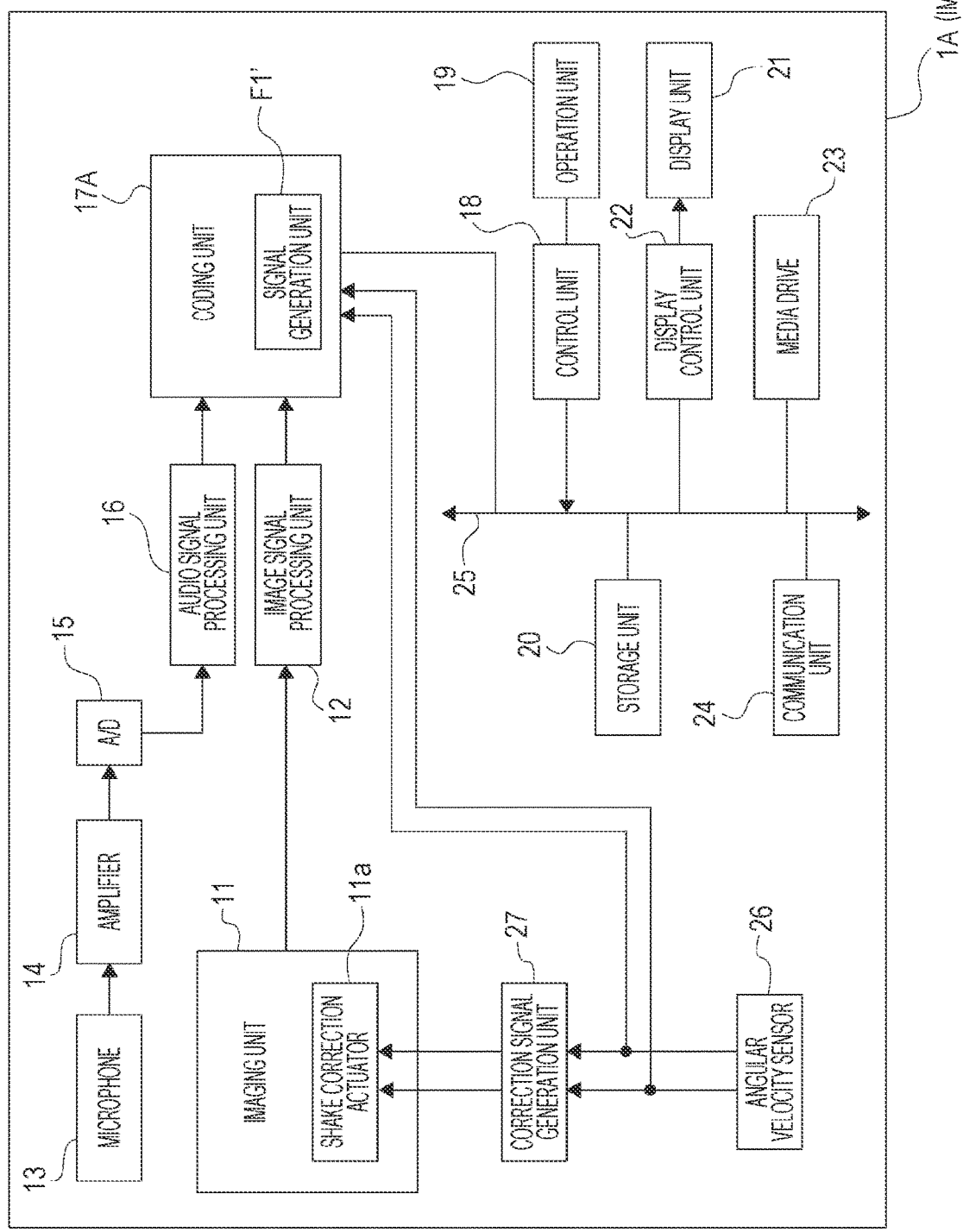
FIG. 10 is a diagram showing an example of an internal configuration of an imaging device as a first modification.

FIG. 10 shows an example of the internal configuration of an imaging device 1A as a first modification corresponding to the case of recording and transmitting an angular signal.

Note that, in the following description, parts that are similar to the parts that have already been explained are designated by the same reference numerals and the description thereof will be omitted.

The difference from the imaging device 1 shown in FIG. 3 is that a coding unit 17A is provided instead of the coding unit 17. The coding unit 17A is different in that a signal generation unit F1' is provided in place of the signal generation unit F1.

The signal generation unit F1' does not convert the value detected by the angular velocity sensor 26 up to the displacement, but converts it up to the angle θ [t], and generates stream data in which the tactile data by the angular signal representing the transition of the angle θ [t] is stored in the stream.

Figure 11:
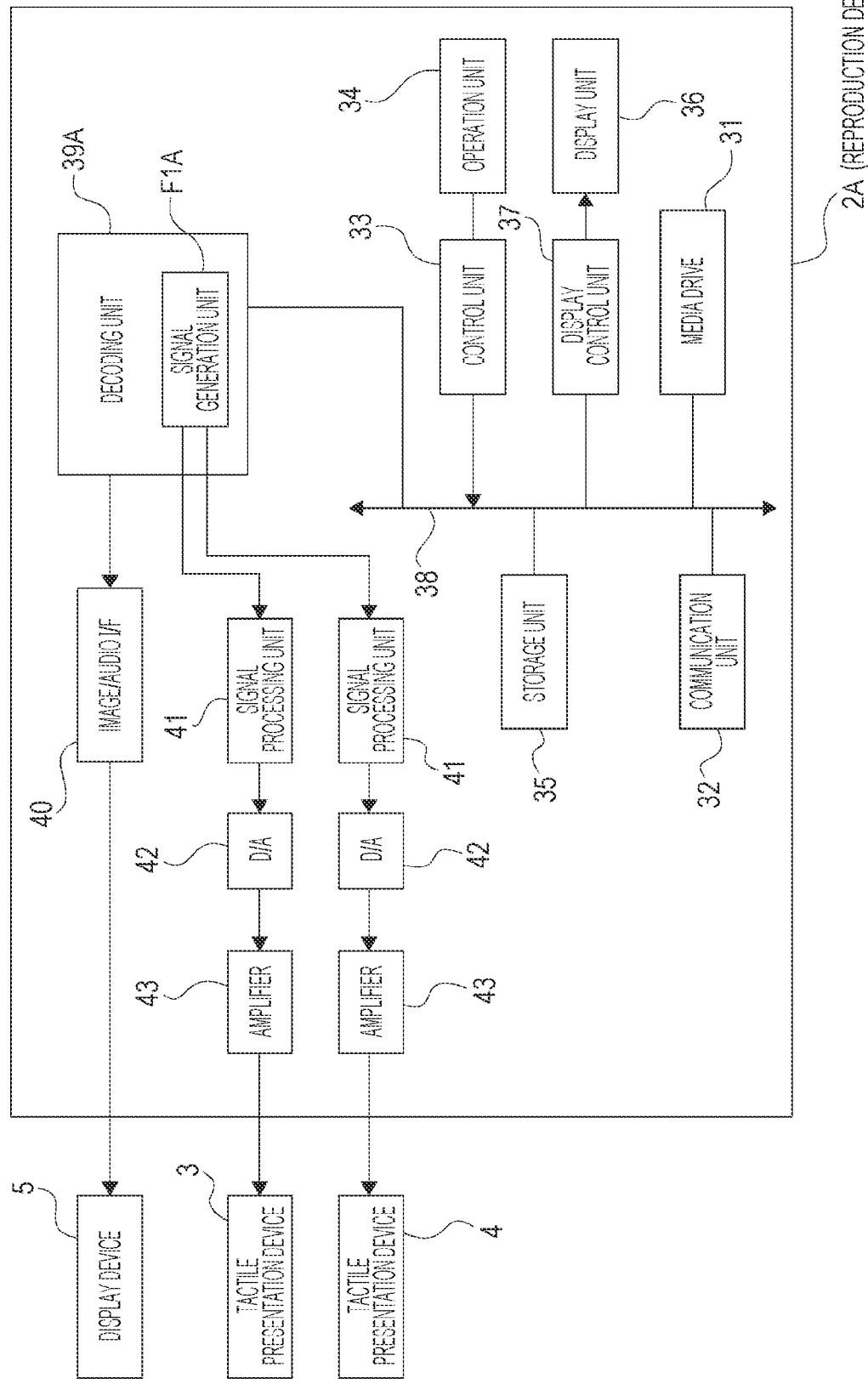
FIG. 11 is a diagram for explaining an example of an internal configuration of a reproduction device as the first modification.

FIG. 11 is a diagram for explaining an example of the internal configuration of a reproduction device 2A as a first modification, and shows the tactile presentation devices 3 and 4 and the display device 5 together with the example of the internal configuration of the reproduction device 2A.

The reproduction device 2A is different from the reproduction device 2 in that a decoding unit 39A is provided instead of the decoding unit 39. The decoding unit 39A includes a signal generation unit F1A. The signal generation unit F1A inputs stream data generated by the signal generation unit F1' in the coding unit 17A via, for example, the media drive 31 or the communication unit 32, and performs processing of converting the angle θ [t] into a displacement and scaling processing of the displacement on the tactile data by the angular signal stored in the stream data to obtain tactile data based on the displacement signal.

In the case of this first modification, the signal generation unit F1A in the reproduction device 2A will be applied to the signal generation unit in the present technology, that is, a signal generation unit that generates a tactile signal on the basis of the detection value of the motion detection unit provided in the imaging device and detecting the motion of the imaging device. That is, the signal generation unit in the present technology can also be provided on the reproduction device side that reproduces the tactile signal.

Note that, the signal generation unit F1' in the imaging device 1A will be also applied to the signal generation unit in the present technology in a sense that it generates a tactile signal by an angular signal.

Here, on the imaging device 1 side, it is not essential to perform conversion to the angle θ [t], and it is also possible to record and transmit the value detected by the angular velocity sensor 26 (that is, the value of the angular velocity) as it is.

In that case, the signal generation unit F1A in the reproduction device 2A also converts the value of the angular velocity stored in the stream data into the angle θ [t].

By providing the signal generation unit F1A as described above in the reproduction device 1A, it is not necessary to convert the angle to the displacement or the angular velocity→the angle→the displacement on the imaging device 1A side, and the processing load of the imaging device 1A can be reduced.

[5-2. Second Modification]

The signal generation unit in the present technology may be provided in a device other than the imaging device provided with the motion detection unit and the reproduction device for reproducing the tactile signal.

Figure 12:
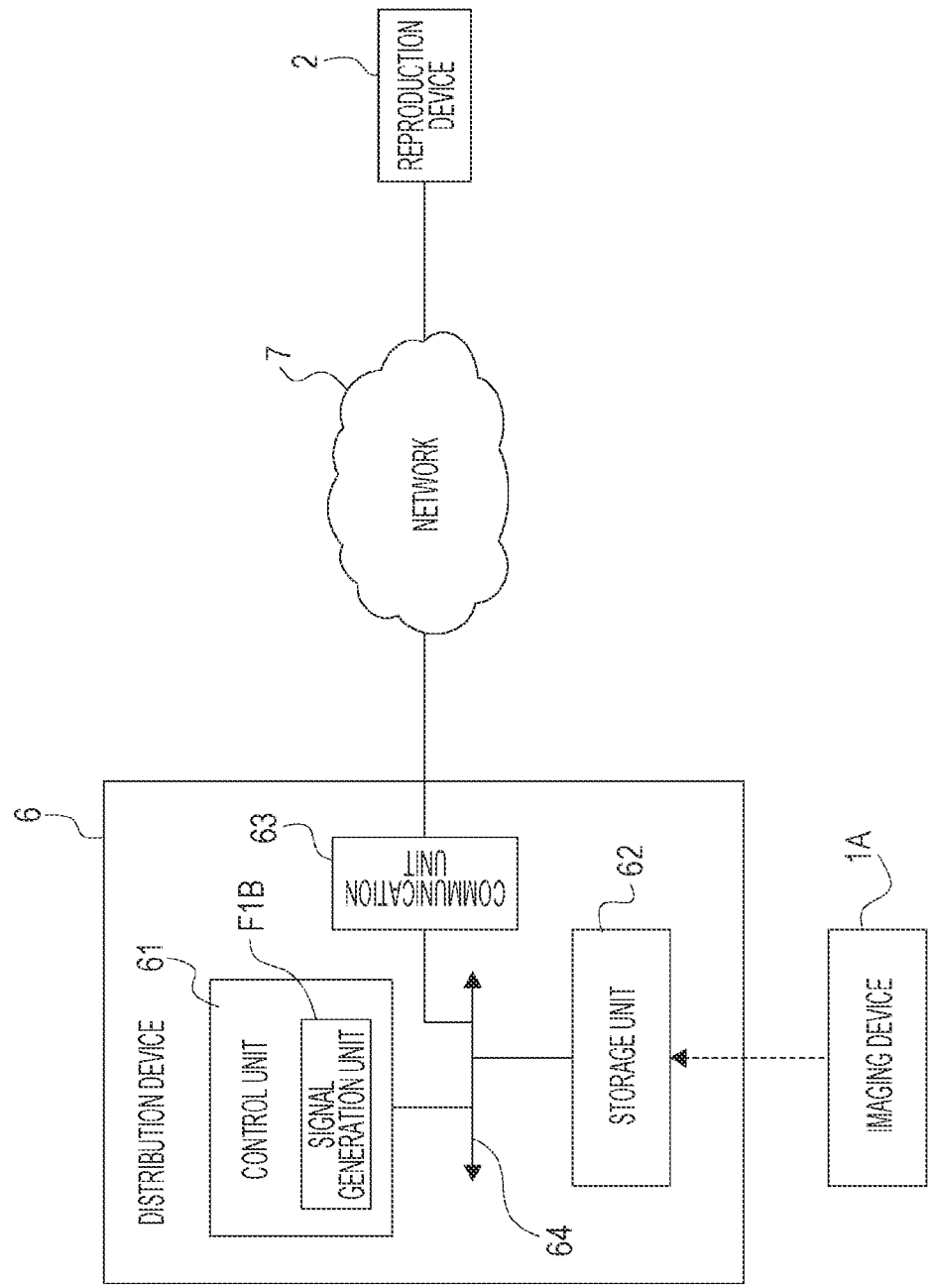
FIG. 12 is a diagram showing a configuration example of a tactile reproduction system as a second modification.

FIG. 12 shows a configuration example of a tactile reproduction system as a second modification.

As shown in the figure, the tactile reproduction system of this example includes an imaging device 1A, a reproduction device 2, and a distribution device 6. In the second modification, a system is assumed in which the distribution device 6 distributes the tactile signal based on the angular velocity obtained by the imaging device 1A to the reproduction device 2 side via a predetermined network 7 such as the Internet.

The distribution device 6 includes a control unit 61, a storage unit 62, and a communication unit 63, which are connected to each other so as to be able to communicate with each other via the bus 64. The control unit 61 includes a microcomputer (information processing device) having a CPU, ROM, RAM, etc., and the CPU integrally controls the entire distribution device 6 by executing processing according to a program stored in the ROM or the like.

The storage unit 62 has a storage device such as an HDD (Hard Disk Drive) or an SSD (Solid State Drive), and is used for storing various data. In particular, the storage unit 62 stores stream data (including moving image data, audio data, and tactile data) generated by the imaging device 1A. The tactile data here is assumed to be tactile data based on an angular signal.

The communication unit 63 communicates with the external device via the network 7.

In this example, the control unit 61 in the distribution device 6 has a function as a signal generation unit F1B. The signal generation unit F1B converts the tactile data by the angular signal included in the tactile data frame into the tactile data by the displacement signal for the stream data stored in the storage unit 62. The control unit 61 causes the communication unit 63 to transmit the stream data including the tactile data thus converted into the displacement signal to the reproduction device 2 via the network 7.

In this second modification, the signal generation unit F1B corresponds to the signal generation unit in the present technology. That is, the signal generation unit in the present technology can be provided in a device other than the imaging device and the reproduction device.

[5-3. Third Modification]

The third modification relates to an application example of tactile reproduction.

In the above description, an example of reproducing the tactile information when the bicycle is run has been given, but the specific application example of the tactile reproduction is not limited to this.

For example, as shown in FIG. 13, consider capturing a moving image of skiing from a first-person viewpoint with the imaging device 1 fixed to a helmet. The thus captured moving image presents the vibration transmitted to the slider's head as a tactile signal to the tactile receiving person, so that it is possible to allow the tactile receiving person to virtually experience in a realistic manner the sensation of sliding on the snow when sliding on a snowy mountain, the impact of landing when performing the acrobatic sliding as shown in FIG. 14, and the like.

At this time, the tactile receiving person does not necessarily have to wear a real ski or a helmet provided with the tactile presentation devices 3 and 4, and as shown in FIG. 15, a method of simply attaching the tactile presentation devices 3 and 4 to the arm or the like with a wristband or the like may be adopted.

Figure 16:
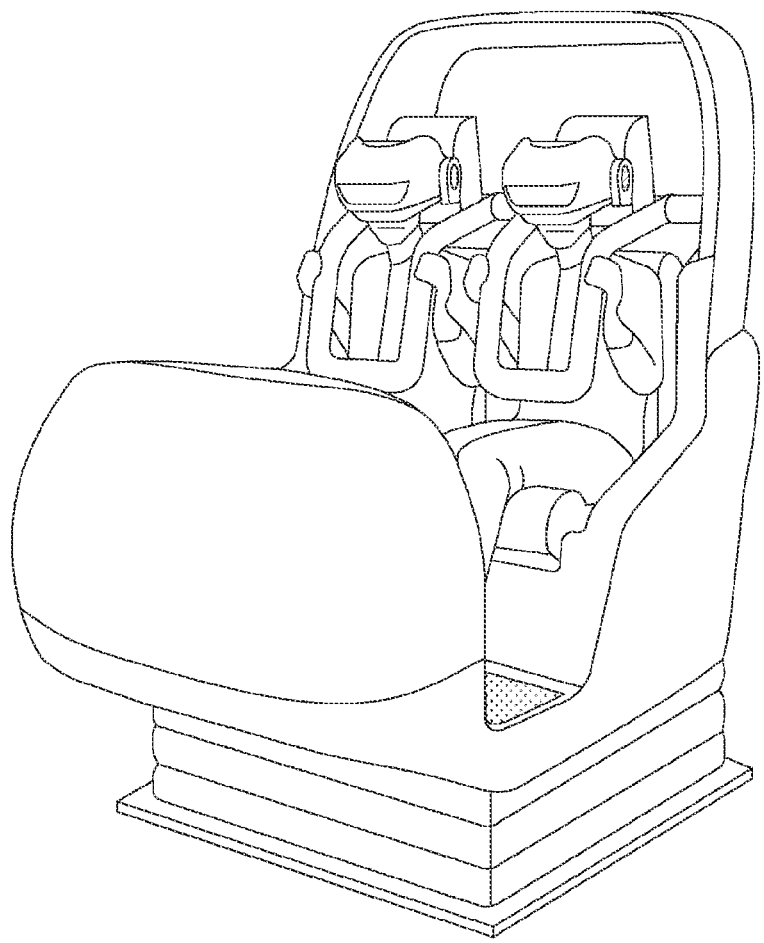
FIG. 16 is a diagram showing an example of a housing on which a tactile receiving person boards for the second modification related to the application of tactile reproduction.
Figure 17:
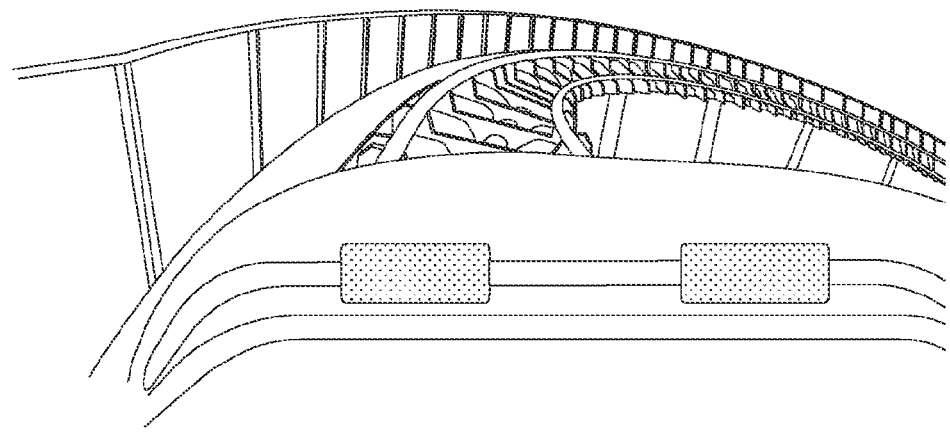
FIG. 17 is a diagram showing an example of a captured image presented to the tactile receiving person for the second modification related to the application of tactile reproduction.

Alternatively, consider a device that allows the tactile receiving person to experience as if he/she is riding an amusement machine such as a roller coaster, as shown in FIG. 16. The tactile receiving person wears an HMD such as VR (virtual reality) goggles, rides on a vibrating housing, for example, a housing that imitates a roller coaster, and receives, while reproducing a moving image of the first-person view of the roller coaster as shown in FIG. 17, the presentation of a vibration synchronized with the moving image.

Figure 18:
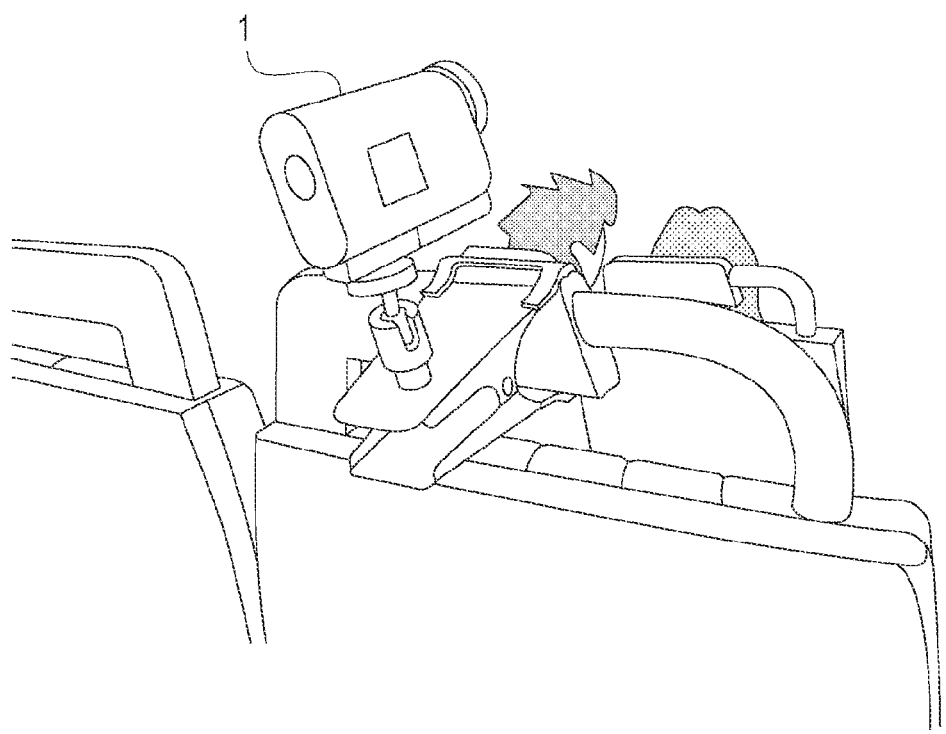
FIG. 18 is a diagram showing an example of a fixing method of an imaging device for the second modification related to the application of tactile reproduction.

The moving image used at this time is assumed to be captured by fixing the imaging device 1 to a roller coaster as shown in FIG. 18, for example. As a result, it is possible to present the vibration synchronized with the moving image to the tactile receiving person.

Note that, the housing on which the tactile receiving person rides is vibrated by the tactile presentation devices 3 and 4, which vibrate the housing in the vertical direction and the horizontal direction, respectively.

[5-4. Other Modifications]

Here, in the above, an example is given in which the tactile presentation devices 3 and 4 are devices corresponding to displacement signals representing a translational movement, but the tactile presentation devices 3 and 4, when being devices corresponding to an angular signal and an angular velocity signal, do not have to convert the angular velocity→angle→displacement or the angular velocity→angle. As an example of a tactile presentation device corresponding to an angular signal or an angular velocity signal, for example, when a relatively large housing as shown in FIG. 16 is vibrated, an actuator that generates a rotational movement so as to reciprocate it between a forward tilted state and a backward tilted state can be mentioned.

Further, in the above, it is assumed that whether or not to convert the angular velocity→angle→displacement or the angular velocity→angle is fixedly determined on the recording or transmitting side of the tactile signal, but it is possible to selectably configure whether or not to convert the angular velocity→angle→displacement or the angular velocity→angle on the recording or transmitting side of the tactile signal, for example, depending on the operation input, the communication result with the reproduction device side, and the like. Specifically, for example, when the reproduction device side corresponds to the input of the angular velocity, the conversion of the angular velocity→the angle→the displacement and the conversion of the angular velocity→the angle are not performed, and when the reproduction device side does not correspond to the input of the angular velocity and corresponds to the input of the angle, the conversion of the angular velocity→the angle is performed.

Further, in the above, an example of detecting the motion of the imaging device by the angular velocity sensor has been given, but the motion of the imaging device can also be detected by image processing on the captured image of the imaging device. Specifically, vibration prediction is performed by image processing on the captured image to detect the motion of the imaging device.

In such motion detection by image processing, for example, motion in the translation direction in each of the X-axis and the Y-axis is detected. Then, an example of generating a tactile signal representing vibration in each of these directions can be given.

In addition, in the above, the example in which the tactile information is reproduced in two directions, the X-axis direction and the Y-axis direction has been given, but the tactile information can be reproduced in three or more directions or only one direction.

Further, in the above, in a case where the tactile information is reproduced in two or more directions, an example of generating a tactile signal for each direction has been given, but it can be also said to be rare that humans clearly recognize the direction and feel vibration, although there are individual differences. Therefore, it is conceivable to integrate all the tactile signals generated in a plurality of directions and present the magnitude of the vector as a single directional vibration.

For example, in the case of the imaging device 1 including the angular velocity sensor 26 corresponding to the two axes of X and Y illustrated so far, if the displacement in each direction of the X axis and the Y axis is obtained, calculate the square root (corresponding to the magnitude of the vector) of the sum of squares of those displacements as in the following [Equation 4], and treat it as a tactile signal representing a single directional vibration.

[Math. 4]

$$|\vec{a}| = \sqrt{a^2x + a^2y}$$ [Equation 4]

Alternatively, in a case where the angular velocity sensor 26 corresponds to the three axes of X, Y, and Z, calculate the square root of the sum of squares of those displacements for the displacements obtained in each of the X-axis, Y-axis, and Z-axis directions, and treat it as a tactile signal representing a single directional vibration.

This makes it possible to present vibrations generated in each direction even if the number of tactile presentation devices is singular. In addition, it is possible to reduce the data capacity of the tactile signal to be recorded/transmitted and reduce the processing load on the reproduction side by the reduction in the number of channels of the tactile signal.

Note that, in a case where the motion detection unit of the imaging device detects motions in three or more directions, as a method of integrating tactile signals, not limited to the method of integrating the tactile signals in all directions into the tactile signals in a single direction as described above, a method of integrating tactile signals for each set in a plurality of directions having different combinations can also be adopted. For example, for the tactile signals in each of the X, Y, and Z axis directions, the tactile signals in the X and Y axis directions and the Y and Z axis directions are integrated into the tactile signals in a single direction, respectively.

Here, the functions of the signal generation units F1, F1A, and F1B are not limited to those realized by hardware, but can also be realized by software processing by a CPU or the like. The software processing is executed on the basis of a program, and the program is stored in a storage device from which a computer device such as a CPU can read.

<6. Summary of Embodiment>

As described above, the signal generation device (imaging device 1, reproduction device 2A, or distribution device 6) as an embodiment includes the signal generation unit (F1, F1', F1A, or F1B) that generates a tactile signal on the basis of the detection value of the motion detection unit (angular velocity sensor 26) that is provided in the imaging device and detects the motion of the imaging device.

This eliminates the need to provide a separate motion detection unit other than the motion detection unit provided in the imaging device in order to realize a system that reproduces tactile information together with visual information such as moving images.

Therefore, it is possible to simplify the configuration of the tactile reproduction system for reproducing the tactile information and reduce the cost.

Further, since the motion detection unit provided in the imaging device is used, the tactile information is easily synchronized with the visual information as the captured image when the image captured by the imaging device is presented to the tactile receiving person when reproducing the tactile information.

Further, in the signal generation device as the embodiment, the signal generation unit generates a tactile signal on the basis of the detection value of the motion detection unit which is an angular velocity sensor.

The angular velocity sensor is generally used as a sensor for correcting optical camera shake of an imaging device.

Therefore, the tactile signal can be generated by using a general imaging device having an optical camera shake correction function, it is not necessary to use a special imaging device, and the cost of the tactile reproduction system can be reduced.

Here, in order to obtain a tactile signal that reflects the motion of the imaging device, the motion of the imaging device can be detected by performing vibration prediction by image processing on the captured image, but in that case, there is concern about an increase in calculation cost. By using the angular velocity sensor as the motion detection unit as described above, it is possible to prevent such an increase in calculation cost, and it is not necessary to use a high-performance signal processing device (for example, DSP) for generating a tactile signal, which is advantageous in terms of cost and power.

Further, in the signal generation device as the embodiment, the signal generation unit generates a displacement signal representing translational movement as a tactile signal on the basis of the angular velocity detected by the angular velocity sensor.

This makes it possible to use a general type of tactile presentation device driven by a displacement signal as a tactile presentation device that gives a tactile stimulus to a tactile receiving person.

Therefore, it is not necessary to use a special tactile presentation device for tactile reproduction, and the cost of the tactile reproduction system can be reduced.

Furthermore, in the signal generation device as the embodiment, the signal generation unit integrates the angular velocity detected by the angular velocity sensor to obtain an angle of the angular velocity sensor, and converts the angle into a displacement to generate a displacement signal.

This makes it possible to appropriately generate a displacement signal from the angular velocity detected by the angular velocity sensor.

Therefore, the tactile reproducibility can be improved.

Further, in the signal generation device as the embodiment, the signal processing unit normalizes the displacement value by the maximum displacement value, and scales the normalized displacement value within a predetermined bit width range.

This makes it possible to generate a displacement signal that appropriately reflects the magnitude of vibration received by the imaging device.

Therefore, the tactile reproducibility can be improved.

Further, in the signal generation device as the embodiment, the signal generation unit integrates the angular velocity detected by the angular velocity sensor to obtain an angle of the angular velocity sensor, and generates an angular signal representing the transition of the angle on the time axis as a tactile signal.

In a case where the tactile presentation device that gives the tactile stimulus to the tactile receiving person is a device corresponding to an angle, it is not necessary to convert the angular velocity detected by the angular velocity sensor into a displacement.

Therefore, by generating the angular signal as the tactile signal as described above, it is possible to reduce the processing load related to the generation of the tactile signal.

Furthermore, in the signal generation device as the embodiment, the signal generation unit generates a signal synchronized with the moving image data obtained by the imaging device as a tactile signal.

It is effective to reproduce visual information together with tactile information in order to provide the tactile receiving person with an experience having a high realistic feeling and a high sense of reality.

By generating the tactile signal synchronized with the moving image data as described above, it is possible to prevent the occurrence of a time lag between the visual information and the tactile information, and it is possible to enhance the realistic feeling and sense of reality.

Further, in the signal generation device as the embodiment, the signal generation unit generates stream data in which the frame data of the moving image data obtained by the imaging device and the frame data of the tactile signal are stored in the same stream.

As described above, the data format for storing the frame data of each data in the same stream is made similar to the general data format adopted for recording and transmitting video/audio data.

Therefore, by adopting the above-mentioned data format, it is possible to easily record and transmit the data including the moving image data and the tactile signal.

Further, in the signal generation device as the embodiment, the motion detection unit detects the motion of the imaging device in each of two or more directions, and the signal generation unit generates tactile signals for each of two or more directions on the basis of the motion detected by the motion detection unit in each of the two or more directions.

This makes it possible for the tactile receiving person to perceive the tactile stimulus including its direction.

Therefore, the tactile reproducibility can be improved.

Furthermore, in the signal generation device as the embodiment, the motion detection unit detects the motion of the imaging device in each of two or more directions, and the signal generation unit generates a signal that integrates motions in two or more directions detected by the motion detection unit as a tactile signal.

It is rare for humans to perceive tactile stimuli particularly due to vibration while clearly recognizing the direction, although there are individual differences.

Therefore, by generating a tactile signal that integrates motions in two or more directions as described above, it is possible to reduce the data capacity of the tactile signal, reduce the number of tactile presentation devices, and reduce the processing load on the reproduction side while ensuring the tactile reproducibility in terms of allowing the tactile receiving person to perceive a tactile stimulus according to the motion of the imaging device.

Further, in the signal generation device as the embodiment, the signal generation unit generates a tactile signal on the basis of the detection value of the motion detection unit that detects the motion by image processing on the captured image of the imaging device.

As a result, motion detection of the imaging device is realized by signal processing on the captured image.

Therefore, it is not necessary to use an imaging device including a sensor element such as an angular velocity sensor when detecting the motion of the imaging device.

Further, the signal generation method as an embodiment is a signal generation method having a signal generation step of generating a tactile signal on the basis of a detection value of a motion detection unit that is provided in the imaging device and detects the motion of the imaging device.

With such a signal generation method as the embodiment, it is also possible to obtain the similar operations and effects as the signal generation device as the above-described embodiment.

Further, the program as an embodiment is a program for causing an information processing device to realize a signal generation function for generating a tactile signal on the basis of the detection value of the motion detection unit that is provided in the imaging device and detects the motion of the imaging device.

By such a program, the signal generation device as the above-described embodiment can be realized.

Further, the reproduction device as the embodiment includes the reproduction unit (decoding unit 39 or 39A) that reproduces the tactile signal generated on the basis of the detection value of the motion detection unit that is provided in the imaging device and detects the motion of the imaging device.

Also with such a reproduction device as the embodiment, the similar operation and effect as the signal generation device as the above-described embodiment can be obtained.

It should be noted that an effect described in the present specification is merely an example and is not limited, and another effect may be obtained.

<7. The Present Technology>

Note that, the present technology can also adopt the following configurations.

(1)

A signal generation device including a signal generation unit that generates a tactile signal on the basis of a detection value of a motion detection unit that is provided in an imaging device and detects a motion of the imaging device.

(2)

The signal generation device according to (1) above, in which the signal generation unit generates the tactile signal on the basis of the detection value of the motion detection unit, which is an angular velocity sensor.

(3)

The signal generation device according to (2) above, in which the signal generation unit generates a displacement signal representing translational movement as the tactile signal on the basis of an angular velocity detected by the angular velocity sensor.

(4)

The signal generation device according to (3) above, in which the signal generation unit obtains an angle of the angular velocity sensor by integrating the angular velocity detected by the angular velocity sensor, and converts the angle into a displacement to generate the displacement signal.

(5)

The signal generation device according to (4) above, in which the signal generation unit normalizes the displacement value by a maximum value of the displacement, and scales the normalized displacement value within a predetermined bit width range.

(6)

The signal generation device according to (2) above, in which the signal generation unit obtains an angle of the angular velocity sensor by integrating the angular velocity detected by the angular velocity sensor, and generates an angular signal representing transition of the angle on a time axis as the tactile signal.

(7)

The signal generation device according to any one of (1) to (6) above, in which the signal generation unit generates a signal synchronized with moving image data obtained by the imaging device as the tactile signal.

(8)

The signal generation device according to any one of (1) to (7) above, in which the signal generation unit generates stream data in which frame data of moving image data obtained by the imaging device and frame data of the tactile signal are stored in the same stream.

(9)

The signal generation device according to any one of (1) to (8) above, in which the motion detection unit detects motion in each of two or more directions of the imaging device, and the signal generation unit generates the tactile signal for each of two or more directions on the basis of the motion in each of the two or more directions detected by the motion detection unit.

(10)

The signal generation device according to any one of (1) to (9) above, in which the motion detection unit detects motion in each of two or more directions of the imaging device, and the signal generation unit generates, as the tactile signal, a signal that integrates motions in the above two or more directions detected by the motion detection unit.

(11)

The signal generation device according to any one of (1), (7) to (10), in which the signal generation unit generates the tactile signal on the basis of the detection value of the motion detection unit that detects the motion by image processing on an image captured by the imaging device.

REFERENCE SIGNS LIST 1, 1A Imaging device
2, 2A Reproduction device
3, 4 Tactile presentation device
5 Display device
Hr, Hv Handlebar
6 Distribution device
11 Imaging unit
11a Shake correction actuator
17, 17A Coding unit
F1, F1', F1A, F1B Signal generation unit
23 Media drive
24 Communication unit
26 Angular velocity sensor
27 Correction signal generation unit
31 Media drive
32 Communication unit
39, 39A Decoding unit
41 Signal processing unit
42 D/A converter
43 Amplifier
61 Control unit
7 Network

The invention claimed is:

1. A signal generation device, comprising:
an angular velocity sensor configured to detect an angular velocity of an imaging device; and
a central processing unit (CPU) configured to:
obtain an angle of the angular velocity sensor by integration of the detected angular velocity;
generate a displacement signal as a tactile signal by conversion of the obtained angle into a displacement, wherein the displacement signal represents translational movement of the imaging device;
normalize a displacement value of the displacement by division of the displacement value by a maximum value of the displacement; and
scale the normalized displacement value within a determined bit width range.

2. The signal generation device according to claim 1, wherein
the CPU is further configured to generate an angular signal representing transition of the angle on a time axis as the tactile signal.

3. The signal generation device according to claim 1, wherein
the imaging device is further configured to obtain moving image data, and
the CPU is further configured to generate a signal synchronized with the moving image data as the tactile signal.

4. The signal generation device according to claim 1, wherein
the imaging device is further configured to obtain moving image data, and
the CPU is further configured to generate stream data in which frame data of the moving image data and frame data of the tactile signal are stored in a same stream.

5. The signal generation device according to claim 1, wherein
the angular velocity sensor is further configured to detect the angular velocity in each of two or more directions of the imaging device, and
the CPU is further configured to generate the tactile signal for each of the two or more directions based on the detected angular velocity in each of the two or more directions.

6. The signal generation device according to claim 1, wherein
the angular velocity sensor is further configured to detect the angular velocity in each of two or more directions of the imaging device, and
the CPU is further configured to generate, as the tactile signal, a signal that integrates the angular velocity in the two or more directions.

7. The signal generation device according to claim 1, wherein
the imaging device is further configured to capture an image, and
the CPU is further configured to generate the tactile signal based on the angular velocity that is detected by execution of an image process on the captured image.

8. A signal generation method, comprising:
in a signal generation device:
detecting, by an angular velocity sensor, an angular velocity of an imaging device;
obtaining an angle of the angular velocity sensor by integration of the detected angular velocity;
generating a displacement signal as a tactile signal by conversion of the obtained angle into a displacement, wherein the displacement signal represents translational movement of the imaging device;
normalizing a displacement value of the displacement by division of the displacement value by a maximum value of the displacement; and
scaling the normalized displacement value within a determined bit width range.

9. A non-transitory computer-readable medium having stored thereon computer-executable instructions which, when executed by a computer, cause the computer to execute operations, the operations comprising:
detecting, by an angular velocity sensor, an angular velocity of an imaging device;
obtaining an angle of the angular velocity sensor by integration of the detected angular velocity;
generating a displacement signal as a tactile signal by conversion of the obtained angle into a displacement, wherein the displacement signal represents translational movement of the imaging device;
normalizing a displacement value of the displacement by division of the displacement value by a maximum value of the displacement; and
scaling the normalized displacement value within a determined bit width range.

10. A reproduction device, comprising:
a central processing unit configured to:
receive a tactile signal from an imaging device; and
reproduce the tactile signal, wherein
the tactile signal comprises a displacement signal representing translational movement of the imaging device,
the displacement signal is generated based on a conversion of an angle into a displacement,
the angle is obtained based on integration of an angular velocity that is detected by an angular velocity sensor in the imaging device;
a displacement value of the displacement is normalized by division of the displacement value by a maximum value of the displacement; and
the normalized displacement value is scaled within a determined bit width range.

* * * * *